United States Patent Office 2,978,404
Patented Apr. 4, 1961

2,978,404

OXIDATIVE SWEETENING WITH ALKALINE MATERIAL AND PARTIAL ESTER OF POLYHYDRIC ALCOHOL

Rolland G. Bowers, Perrysburg, Ohio, assignor to Sun Oil Company, Philadelphia, Pa., a corporation of New Jersey No Drawing. Filed June 18, 1959, Ser. No. 821,099

9 Claims. (Cl. 208—204)

This invention relates to sweetening sour hydrocarbon distillates, and more particularly to a manner of providing increased sweetening rate.

It is known in the art to sweeten sour hydrocarbon distillates by contact with phenylene diamine compounds in the presence of an alkaline catalyst. The sweetening process is believed to involve oxidation of mercaptans to disulfides, by gaseous oxygen, catalyzed by the phenylene diamine compound and the alkaline material. Such oxidation occurs, though at a lesser rate, when the distillate is contacted with alkaline material and oxygen in the absence of the phenylene diamine.

According to the present invention, a novel manner is provided of obtaining more rapid sweetening. This result is obtained according to the invention by carrying out the sweetening operation in the presence of an added partial ester of a polyhydric alcohol.

Any suitable polyhydric alcohol having two or more hydroxyl groups per molecule can be employed in the preparation of an ester for use according to the invention. Examples of suitable ester-forming polyhydric alcohols are glycols such as ethylene glycol, propylene glycol, butylene glycol, 1,5-pentanediol, 1,6-hexanediol, diethylene glycol, triethylene glycol and higher analogs; glycerol; pentaerythritol; sorbitol; mannitol, etc. Glycerol is a preferred polyhydric alcohol for preparation of the ester additive. For further disclosure of polyhydric alcohols, reference is made to R. E. Kirk et al., "Encyclopedia of Chemical Technology," volume 1 (1947), page 308, Tables II and III, and pages 321 to 333.

The ester additive contains unesterified hyroxyl groups. Alkoxylated derivatives of the esters, prepared by reaction of alkylene oxides with one or more of the free hydroxyl groups, can be employed if desired.

Examples of polyhydric alcohol partial esters which are suitable for use according to the invention are glycerol mono-oleate, sorbitan monostearate (Atlas Powder Company's "Span 60"), sorbitan mono-oleate (Atlas' "Span 80"), soribtan sesquioleate (Atlas' "Arlacel C"), polyoxyethylene sorbitol tetraoleate having viscosity of 200 to 300 cp. at 25° C. and specifiic gravity of 0.92–0.98 (Atlas' "G–2854"), polyoxyethylene sorbitol pentaoleate having viscosity of 100 to 200 cp. at 25° C. and specific gravity of 0.92–0.98 (Atlas' "G–2855"), polyoxyethylene sorbitol cottonseed oil derivative having viscosity of 100 to 200 cp. at 25° C. and specific gravity of 0.92–0.98 (Atlas' "G–931"), stearic acid monoester of polyethylene glycol having 10 ethylene glycol units, abietic acid monoester of polyethylene glycol having 15 ethylene glycol units, etc.

Preferred esters for use according to the invention are the glycerol monoesters and diesters of fatty acids having 16 to 22 carbon atoms, the sorbitol or sorbitan partial esters of such fatty acids, polyalkoxy derivatives of such glycerol, sorbitol or sorbitan esters wherein the derivatives contain 5 to 25 ethoxy or propoxy units, and polyalkylene glycol monoesters of such fatty acids wherein the glycol contains 5 to 25 ethoxy or propoxy units. Howver, other polyhydric alcohol partial esters can be employed.

Any suitable organic monocarboxylic acid can be employed in the preparation of the ester additive. Thus, the acid can be an aromatic, aliphatic, cycloaliphatic, or heterocyclic carboxylic acid. Preferred acids are: the naturally occurring fatty acids, more preferably those having 12 to 30 carbon atoms per molecule, e.g. lauric, myristic, palmitic, oleic, stearic, erucic acids, etc.; petroleum naphthenic acids; rosin acids; and mixtures of carboxylic acids obtained by the partial oxidation in liquid phase of hydrocarbon mixtures such as petroleum fractions, as disclosed in L. W. Jones, United States Patent No. 2,756,211 issued July 24, 1956, and the disclosures referred to in the specification of that patent. Other types of acids can be employed to make the ester additive, e.g. benzoic acid, furoic acid, etc. However, the acids previously mentioned are preferred.

The amount of ester employed according to the process of the invention is an amount sufficient to promote dispersion of the alkaline material in the hydrocarbon phase. Generally, a greater intimacy and permanence of dispersion are obtained when using relatively large amounts of the ester. The amount employed is preferably that which is sufficient to produce a dispersion which will be permanent throughout the sweetening period under the conditions involved in the sweetening process, but not so great as to make it excessively difficult to separate the alkaline material from the hydrocarbons at the end of the sweetening period. In the light of the present specification, a person skilled in the art can determine a proper amount of ester to employ in order to obtain these results. Generally, the amount will be within the approximate range from 0.001 to 1.0 weight percent based on the hydrocarbon phase.

The known phenylene diamine compounds for use in inhibitor sweetening are generally suitable for use according to one embodiment of the invention. The most commonly used compound is N,N'-di-secondary-butyl-p-phenylene diamine. Other suitable phenylene diamine compounds include N,N'-di-isopropyl-p-phenylene diamine, N,N'-di-secondary-amyl-p-phenylene diamine, N-isopropyl-N'-secondary-butyl-p-phenylene diamine, N-isopropyl-N'-secondary-amyl-p-phenylene diamine, N-secondary-butyl-N'-secondary-amyl-p-phenylene diamine, etc. The amount of phenylene diamine compound employed is generally within the approximate range from 0.0001 to 1.0 weight percent based on hydrocarbons, more preferably, 0.001 to 0.1 weight percent.

The alkaline material which is employed in the process according to the invention is any alkaline material which is known for use in catalyzing inhibitor sweetening reactions. Examples of suitable alkaline materials are the hydroxides of the alkali metals or alkaline earth metals, sodium, potassium, calcium, strontium, barium, etc., ammonia, and organic basic compounds which are substantially insoluble in hydrocarbons, e.g. polyamines such as diethylene triamine, triethylene tetramine, tetraethylene pentamine, 1,2-diaminopropane, 1,3-diaminobutane, 1,3-5-triaminopentane, 1,3,6-triaminohexane, 1,3,5,7-tetraminoheptane, etc., aminoalcohols including aminoethanol, diaminopropanol, triaminobutanol, tetraminopentanol, etc. and quaternary ammonium compounds including tetramethyl ammonium hydroxide, tetraethyl ammonium hydroxide, tetrapropyl ammonium hydroxide, tetramethyl ammonium methoxide, tetramethyl ammonium ethoxide, tetraethyl ammonium ethoxide, etc.

The amount of alkaline material which is employed in the process of the invention is preferably within the approximate range from 0.01 to 5 weight percent, although any amount known to be suitable for use in oxidative sweetening operations can be employed.

The temperature conditions of the sweetening operation according to the invention can be those which are employed in the conventional sweetening operations. Preferably, relatively low temperatures, e.g. in the range from 50° F. to 125° F., are employed in order to favor the dispersion of the alkaline material in the hydrocarbons.

In one embodiment, the process according to the invention is carried out without recirculation of alkaline material or other means for agitating the materials in the sweetening zone. The amount of ester present is chosen to provide maintenance of a dispersion of alkaline material in hydrocarbons during a substantial portion of the sweetening period, and preferably throughout the sweetening period, with separation of the alkaline material from the hydrocarbons at some time during the sweetening period or preferably at the end of the sweetening period. Generally the length of time during which the dispersion persists is proportional to the amount of ester which is present. Therefore, by choosing the proper amount of ester, it is possible to obtain the desired length of time during which the dispersion persists. In the light of the present specification, a person skilled in the art can select a proper amount of ester to be employed in a given instance.

In another embodiment, the sweetening process is carried out with recirculation of alkaline material or with other agitation means. The presence of the ester provides better dispersion of the alkaline material in hydrocarbons during the sweetening period than can be obtained with the same agitation means in the absence of the ester. At the conclusion of the sweetening period, the agitation is terminated, and the alkaline material separates from the hydrocarbons.

Any suitable means can be employed if desired to assist in the separation of phases at the end of the sweetening period. For example, the materals in the sweetening zone can be subjected to elevated temperature in order to promote the resolution of dispersion. If desired, known demulsifying agents can be added to the mixture of materials or other known coalescing means can be employed to promote the resolution of the dispersion.

The following examples illustrate the invention:

Example 1

The following materials are intimately admixed in the indicated proportions:

Gasoline _____ parts by weight__ 100
N,N'-di-secondary-butyl-phenylene diamine _____ 0.01
10% aqueous sodium hydroxide _____ 0.1
Sorbitan monooleate _____ 0.01

The gasoline is a 62° A.P.I., 400° F. endpoint, catalytically cracked and caustic-pretreated gasoline containing about 0.01 weight percent mercaptan sulfur. The mixture is stored in a tank for 96 hours at 75° F. The sorbitan monooleate promotes dispersion of the sodium hydroxide in the gasoline and reduces the tendency of the sodium hydroxide to settle out. The mixture is agitated by conventional recirculation technique during the sweetening period, and this agitation is, because of the presence of the sorbitan monooleate, capable of maintaining better dispersion throughout the sweetening period than in the absence of the sorbitan monooleate.

At the conclusion of the sweetening period, the agitation is terminated, and the aqueous sodium hydroxide separated from the gasoline, which is doctor sweet.

Similar results are obtained employing other phenylene diamine sweetening agents, other alkaline materials, and other partial esters of polyhydric alcohols such as those disclosed previously.

Example 2

A mixture of equal parts of sour gasoline and furnace oil, the mixture containing 0.0068 wt. percent of mercaptan sulfur, is contacted at room temperature with 2.5 volume percent of 20° Baumé caustic soda based on the hydrocarbon mixture, with 5 pounds of the diamine of Example 1 per 1000 barrels of hydrocarbon mixture, and with 10 pounds of red oil fatty acid monoesters of polyethylene glycol per 1000 barrels of hydrocarbon mixture. The monoesters are previously prepared by reacting a fatty acid mixture containing about 80 parts of oleic acid, 10 parts of linoleic acid, 1 part of linolenic acid, and the remainder palmitic and stearic acids, with 15 moles of ethylene oxide per mole of fatty acid mixture. The monoesters have specific gravity at 25° C. of 1.049.

The hydrocarbon mixture, caustic soda, diamine and monoesters are shaken together for one hour, then allowed to stand for 5 hours. Sufficient dissolved oxygen is present to oxidize mercaptans and reduce the mercaptan sulfur content to 0.0052 wt. percent at 4 hours after the first contact. At 6 hours after first contact, 100 cc. of air per 400 cc. of hydrocarbon mixture are injected, and the sweetening mixture shaken for 15 minutes, then allowed to stand for the rest of the experiment. At 24 hours after first contact, the mercaptan sulfur content is 0.0045 wt. percent; at 50 hours, 0.0029 wt. percent; and at 68 hours, 0.0022 wt. percent.

To determine the effect of the monoesters, an identical experiment is performed in which the monoesters are omitted. The following table shows the result:

| Time in Hours | Mercaptan Sulfur Content | |
| --- | --- | --- |
| | Monoesters Present | Monoesters Absent |
| 4 | 0.0052 | 0.0057 |
| 24 | 0.0045 | 0.0046 |
| 50 | 0.0029 | 0.0034 |
| 68 | 0.0022 | 0.0031 |

These results show the increase in sweetening rate obtained with the monoesters.

Example 3

The procedure of Example 2 is repeated, omitting however the phenylene diamine derivative. The following table shows the results:

| Time in Hours | Mercaptan Sulfur Content | |
| --- | --- | --- |
| | Monoesters Present | Monoesters Absent |
| 4 | 0.0055 | 0.0062 |
| 24 | 0.0051 | 0.0054 |
| 50 | 0.0048 | 0.0051 |
| 68 | 0.0046 | 0.0051 |

These results show that the monoesters accelerate oxidative sweetening with caustic in the absence of a phenylene diamine inhibitor. However, comparison of these results with those obtained in Example 2 shows that the inhibitor provides a very beneficial further increase in sweetening rate, and that the effect of the monoesters is greater when the inhibitor is present.

Example 4

The procedure of Example 2 is repeated using a glycerol monoester of fatty acid in place of the polyethylene glycol monoester, and using as charge stock another gasoline-furnace oil blend, this blend having initial mercaptan sulfur content of 0.0059 wt. percent. A mercaptan sulfur content of 0.0020 is obtained after 64 hours.

Generally similar results to those obtained in the above examples are obtained using other alkaline material such as those disclosed previously. Preferred alkaline materials are 5 to 20 weight percent solutions of alkali metal hydroxide or carbonate in water. Generally similar results are also obtained using other phenylene diamine agents and partial esters such as those disclosed previously.

This application is a continuation-in-part of copending application Serial No. 685,371 filed September 23, 1957, and now abandoned. In the parent application, it was indicated that the partial ester, to be effective in oxidative sweetening, should have hydrophile-lipophile balance (HLB), as defined in an article by W. C. Griffin in "Journal of the Society of Cosmetic Chemists," volume 1, page 311 (1949), within the approximate range from 3 to 6. It has now been found that HLB is not critical, and that partial esters as defined herein, including esters having HLB outside that range, are generally effective to increase the sweetening rate.

The invention claimed is:

1. In a process for sweetening hydrocarbons which comprises contacting sour hydrocarbons with oxygen in the presence of an alkaline catalyst, the improvement which comprises increasing the sweetening rate by incorporating in the reaction mixture a partial ester of a polyhydric alcohol.

2. Process according to claim 1 wherein said partial ester is a monoglyceride of an organic carboxylic acid containing 12 to 30 carbon atoms.

3. Process according to claim 1 wherein said contacting is in the presence of a phenylene diamine sweetening agent.

4. Process according to claim 3 wherein said agent is an N,N'-dialkyl phenylene diamine, and said alkaline catalyst is an aqueous solution of alkali metal hydroxide.

5. Process according to claim 1 wherein the amount of said alkaline catalyst is within the approximate range from 0.01 to 5 wt. percent based on hydrocarbons, and the amount of said ester is within the approximate range from 0.001 to 1.0 wt. percent based on hydrocarbons.

6. Process according to claim 1 wherein the temperature of contacting is within the approximate range from 50 to 125° F.

7. Process according to claim 6 wherein said temperature is ambient temperature.

8. Process according to claim 1 wherein said partial ester is a fatty acid monoester of a polyalkylene glycol.

9. Process according to claim 1 wherein said partial ester is a fatty acid monoester of sorbitan.

References Cited in the file of this patent

UNITED STATES PATENTS

| | | |
|---|---|---|
| 2,616,831 | Rowenwald | Nov. 4, 1952 |
| 2,891,002 | Bowers | June 16, 1959 |

OTHER REFERENCES

"Atlas Surfact Active Agents" (1950), published by Atlas Powder Co., pages 10–22 and 28 and 29 relied on.